No. 765,080. Patented July 12, 1904.

UNITED STATES PATENT OFFICE.

PAUL JULIUS AND FRANZ OSTHELDER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

YELLOW-RED AZO COLOR.

SPECIFICATION forming part of Letters Patent No. 765,080, dated July 12, 1904.

Application filed April 12, 1904. Serial No. 202,881. (No specimens.)

*To all whom it may concern:*

Be it known that we, PAUL JULIUS, a subject of the Emperor of Austria-Hungary, and FRANZ OSTHELDER, a subject of the King of Bavaria, residing at Ludwigshafen-on-the-Rhine, in the Kingdom of Bavaria, German Empire, have invented new and useful Improvements in Azo Coloring-Matter, of which the following is a specification.

We have discovered that a brilliant orange coloring-matter can be obtained by combining diazotized ortho-chlor-para-toluidin with beta-naphthol, which coloring-matter is insoluble in water and very fast against the action of lime and of light and is therefore valuable for dyeing and printing on cotton and also for the preparation of lakes. The coloring-matter can be produced on the fiber by subjecting material which has been treated with an alkaline solution of beta-naphthol (with or without the addition of Turkey-red oil or a similar substance) to the action of the diazotized chlor-toluidin, or the coloring-matter can be produced as such by combining the diazo compound with an alkaline solution of beta-naphthol. In this case it is convenient to previously mix the solution of beta-naphthol with Turkey-red oil or oleic acid or soap or a body of a like nature, with or without the addition of one or more of the substrata which can be used in the preparation of lakes—for instance, hydrate of alumina or heavy spar.

The following example will serve to further illustrate the nature of our invention, which, however, is not limited to this example. The parts are by weight. Dissolve one hundred and forty-one and a half (141.5) parts of ortho-chlor-para-toluidin in the necessary amount of water, which contains two hundred and fifty (250) parts of hydrochloric acid, (containing about thirty-two (32) per cent. of HCl.) Cool by means of ice and while stirring add seventy-two (72) parts of solid sodium nitrite. Allow the resulting solution to run while stirring into a solution of one hundred and forty-five (145) parts of beta-naphthol in water containing sixty (60) parts of Turkey-red oil (containing about fifty (50) per cent. of the oil) and two hundred and fifty (250) parts of caustic-soda solution, (containing thirty-five (35) per cent. of NaOH.) The formation of the coloring-matter is very quickly completed, and the brilliant orange-yellow precipitate is filtered off and used as paste with or without the further addition of Turkey-red oil. The same procedure is followed when the coloring-matter is formed in the presence of a substratum. In this case the beta-naphthol and the substratum and, if necessary, Turkey-red oil or the like can be mixed together and the diazo solution then be run into the mixture.

When it is desired to produce the coloring-matter on the fiber, the diazo solution should before being used be treated with sodium acetate until the excess of mineral acid has been removed, and the material, which has previously been impregnated with beta-naphthol, is then passed through this solution, or a suitable thickening agent may be added to the diazo solution to form a paste, which is printed onto the material which has previously been treated with beta-naphthol.

Our new coloring-matter as obtained according to the example is practically insoluble in water. It is yellowish red and also yields a yellowish-red lake when mixed with barium sulfate.

Upon gentle reduction our coloring-matter yields ortho-chlor-para-toluidin and amido-naphthol.

What we claim is—

The new azo coloring-matter such as can be obtained by combining diazotized ortho-chlor-para-toluidin with beta-naphthol, which coloring-matter is insoluble in water, which is yellowish red, which yields a yellowish-red lake when mixed with a substratum, and which upon reduction yields ortho-chlor-para-toluidin and amido-naphthol.

In testimony whereof we have hereunto set our hands in the presence of two subscribing witnesses.

PAUL JULIUS.
FRANZ OSTHELDER.

Witnesses:
 ERNEST F. EHRHARDT,
 J. ALEC. LLOYD.